United States Patent [19]
Drummond et al.

[11] 3,867,776
[45] Feb. 25, 1975

[54] LICENSE PLATE HOLDER

[76] Inventors: Carl W. Drummond, Rt. 3, Box 216;
Donald L. Weber, 171 Ash St., both
of Lake Zurich, Ill. 60047

[22] Filed: July 9, 1973

[21] Appl. No.: 377,511

[52] U.S. Cl. ................................................ 40/209
[51] Int. Cl. .............................................. G09f 7/00
[58] Field of Search............ 40/10, 200, 209, 129 C,
40/16.2, 16.4

[56] References Cited
UNITED STATES PATENTS

| | | | |
|---|---|---|---|
| 1,248,043 | 11/1917 | Ware | 40/209 |
| 2,080,164 | 5/1937 | Conner | 40/16.4 X |
| 2,301,834 | 11/1942 | Whaley | 40/129 C |
| 2,624,966 | 1/1953 | Baumgartner | 40/209 |

FOREIGN PATENTS OR APPLICATIONS

| 5,900 | 10/1933 | Australia | 40/209 |
|---|---|---|---|

*Primary Examiner*—Robert W. Michell
*Assistant Examiner*—Wenceslao J. Contreras
*Attorney, Agent, or Firm*—Lockwood, Dewey, Zickert & Alex

[57] ABSTRACT

An economically manufactured, integral license plate holder is disclosed. The lateral vertical edges of the license plate are folded rearwardly under narrow single lock folds at the lateral vertical edges of the holder. Fasteners passing through registered holes in the plate and holder mount the assembly to the bumper. The holder and license plate are rearwardly bent at the marginal lateral portions thereof along vertical bend lines which are positioned between the adjacent fastener hole and the edge of the plate.

The vertical bend lines define an offset central panel which remains spaced-apart from the bumper to which the plate-holder assembly is mounted. The entire edge of the central offset panel opposite the fastener holes has a third single lock fold under which the edge of the elongated edge of the license plate overlaying the offset principal panel is positioned. The fasteners cause the lateral edges of the holder to bear firmly against the surface of the bumper. Car wash vertical axis rotary brush-induced damage and deformation of the plates or holder is successfully alleviated when the holders of the present invention are used.

3 Claims, 4 Drawing Figures

PATENTED FEB 25 1975 3,867,776

LICENSE PLATE HOLDER

This invention relates to a license plate holder for use on automobiles, trucks, and the like.

At the present time license plates which are not supported in a special holder are deformed, and become damaged and unsightly, or are disconnected from their mountings as a result of the abuse to which they are subjected by vertical axis brushes in car washes. Outside salesmen, and others who are particularly fastidious about the appearance of their vehicle, and who, for that reason, frequently have their vehicles washed in a car wash are the very people most likely to encounter severe damage of their license plates as a result. The resulting unsightly appearance of the license plate is particularly annoying to such people who are particularly meticulous about the appearance of their vehicle, inasmuch as it runs counter to the very purpose of having the vehicle washed.

Many of the license plate holders suggested heretofore have been unduly complicated, expensive to manufacture and purchase, and cumbersome to use. Others are relatively simple and inexpensive but are ineffective with respect to protecting license plates from car wash brush-induced deformation, and themselves are easily deformed and soon unsightly.

Many automobile bumpers are factory-equipped with plastic license plate mounting inserts pre-seated in appropriately positioned bumper slots to mount the license plates and yet reduce corrosion of the fasteners. However, once these inserts age-shrink somewhat, they tend to loosen in their slots. When the brushes in car washes tend to engage the license plate backer, they can pull or otherwise remove the entire plate and holder from the bumper by dislodging the plastic inserts. It has been found to be very difficult to properly reinsert the plastic insert, and owners who have found the plastic insert pulled loose quite commonly resort to the corrosion prone nut and bolt arrangement rather than attempt to re-seat the insert. Moreover, re-seating of the plastic inserts with a rubber mallet, for example, is only a temporary solution, since the abuse of the insert in the re-seating, and the fundamental cause of the problem, namely, the vulnerability and susceptibility of the plate and backer to engagement and dislodgement by the vertical axis car wash brushes remains unsolved.

Many automobile bumpers have a complex surface configuration in accordance with the overall styling and design of the vehicle. In some instances, a recess is provided in the exposed surface of the bumper for the purpose of mounting a license plate therein. However, because of the complex surface configuration of the bumpers, it is not uncommon for at least some portions of the vertical edges of the license plates in these recesses to be sufficiently exposed because of the complex curvature of the bumper for vertical axis brushes to engage the exposed portions of the vertical edges, and deform the license plate from the bumper recess. Of course any bending of the plate increases the likelihood that a substantial portion of the plate will be encountered by the brush during the next car wash and the damage is aggravated. Hence it is not uncommon for vertical axis brushes to substantially damage or dislodge plates and holders mounted in recesses in bumpers.

It will be appreciated that license plates which are badly mangled, bent over, or otherwise substantially deformed, do not serve one of the primary functions for which license plates must be readable, namely, the function of vehicle identification.

This invention has as a principal object the provision of a car wash brush-proof license plate holder which is economical to manufacture and is so simple to use that a person having sufficient skill to change a license plate will have sufficient skill to properly use the license plate holder of the present invention.

It is an important object of the present invention to provide a license plate holder which eliminates the vertical-axis brush-induced deformation and other damage of the license plate.

It is a further object of the present invention to provide an economical license plate holder which itself is not susceptible to substantial damage or deformation by vertical axis car wash brushes.

It is another object of the present invention to provide a license plate holder which eliminates the tendency of vertical axis brushes to dislodge the license plate and backer from the automobile bumper, for example, to such an extent that the tendency to dislodge pre-installed plastic plate-mounting inserts from the bumper is eliminated.

It is a further object of the present invention to provide a license plate holder which can be used easily in conjunction with a bumper having a license plate recess provided therein.

These and other objects which will be apparent hereinafter are all achieved in accordance with the present invention which is described herein in connection with a particularly preferred embodiment, and with the aid of the accompanying drawings, in which.

Figure 1:
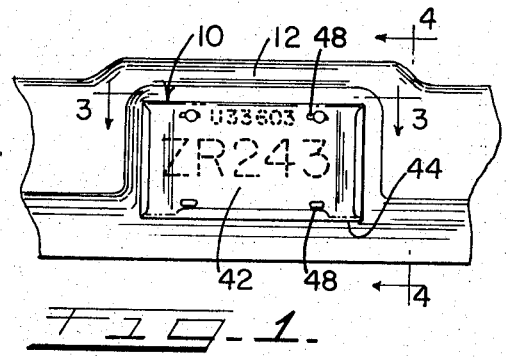
FIG. 1 is an elevational view of the license plate-holder assembly mounted on the bumper of a vehicle.
Figure 4:
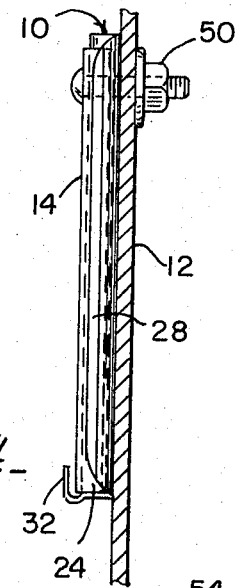
FIG. 4 is a side sectional view taken approximately along the line 4—4 in FIG. 3 showing a side view of the holder and a sectional view through the bumper.
Figure 2:
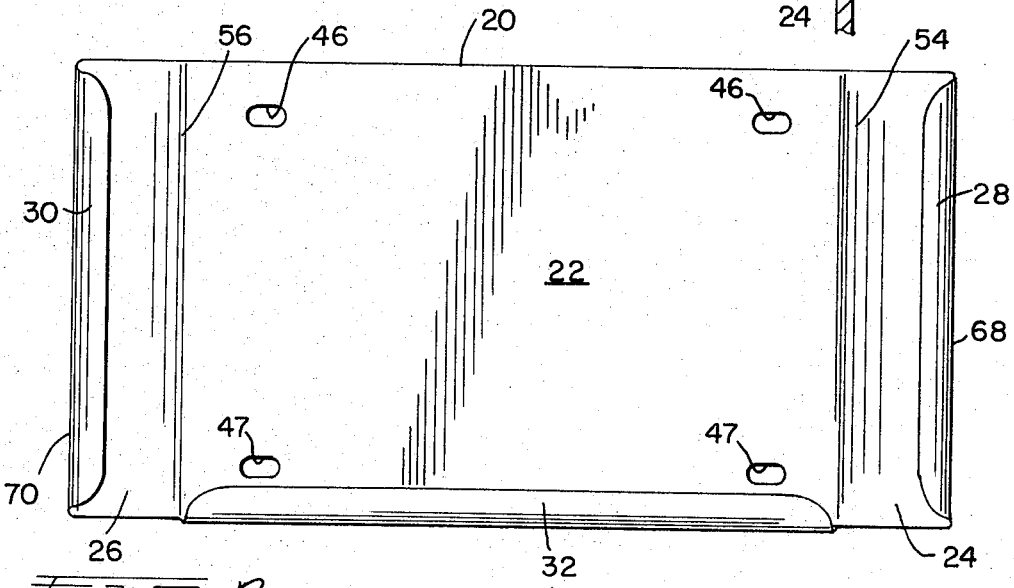
FIG. 2 is an enlarged elevational view of the holder.
Figure 3:
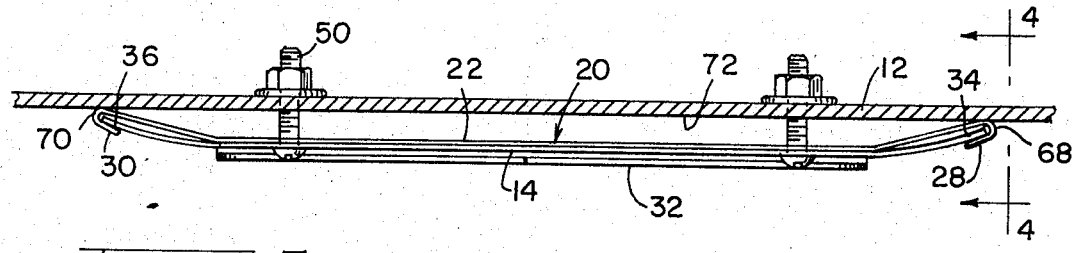
FIG. 3 is a cross-sectional view taken along the line 3—3 in FIG. 1, showing a top view.

A license plate-holder assembly is generally indicated by the numeral 10 in FIG. 1 in which the plate and holder assembly 10 is shown mounted on a conventional vehicle bumper 12. Assembly 10 comprises a typical license plate 14 and holder in accordance with the present invention generally indicated by the numeral 20. Holder 20 is preferably made from a single sheet of suitable metal such as, for example, aluminum. In its general configuration as described herein, holder 20 comprises an elevated or offset main central panel 22, right and left rearwardly bent lateral marginal portions 24, 26, respectively. The marginal portions 24, 26 have respective vertical single lock folds 28-30, at the lateral extremes thereof. Main central panel 22 has a bottom edge single lock fold 32 extending along the entirety of one free edge thereof. As indicated in FIG. 3, the horizontal dimensioning of lateral marginal portions 24, 26, and main central panel 22 is such that a license plate 14, when flexed and inserted as illustrated in FIG. 3 has the extreme lateral marginal portions 34, 36 thereof residing securely within lateral single lock folds 28, 30. During installation of plate 14, the license plate 14 can be slightly flexed or arched so that the edges 34, 36 are received within lateral folds 28, 30 of holder 20 while the plate 14 is at a position above bottom single lock fold 32. The central region 42 of the license plate 14 can then be pressed back against the offset central panel portion 22 of plate holder 20 and slid downwardly so that the bottom edge 44 is moved rearwardly of bottom single lock fold 32, and into a position between fold 32 and panel 22.

Slotted openings 46, 46 are provided in central panel 42 of holder 10 and are positioned to align with, or register with, the fastener openings 48, 48 in the license plate through which the fasteners 50, 50 extend. Thus, as shown in FIG. 3, respective fasteners 50, 50 extend through the respective openings 46, 46, 48, 48 to secure the plate and holder assembly 10 to the automobile bumper 12.

It will be appreciated that the right and left lateral single lock folds 28, 30, are sized to extend substantially the entire length of the edges 34, 36 of license plate 14 and that folds 28, 30 are positioned to completely cover edges 34, 36 when the license plate is properly inserted and aligned for mounting. The width of folded-over portion of folds 28, 30, 32 must be great enough to securely receive plate 14 thereunder, and this dimension depends upon how great a gap exists between the edges of plate 14 and opposing inside edges of folds 28, 30, and 32. Assuming a close fit plate of plate 14 in the holder, folds 28, 30, 32 having a width of about one-half inch are eminently satisfactory.

It is noted that rearwardly extending lateral portions 24, 26 are formed at respective fold lines 54, 56 respectively which occur in the illustrated embodiment, less than half way between the fastener openings 46, 46 and the lateral edge 68, 70. Thus, fold lines 54, 56 define the boundaries of the central panel 22. Fold lines 54, 56 are preferably located at least 1 inch inwardly of edges 68, 70, and are more preferably situated approximately 1½ inches from these edges. The angle formed between the rear of the central panel 22 and respective rearwardly extending lateral portions 24, 26 are obtuse angles preferably between about 135° and 165°, and any obtuse angle is sufficient to substantially offset the central panel 22 from the underlying surface 72 of bumper 14. It is preferred that the offset provide between about ⅝ inches to 1 inches distance between the rear panel 22 and surface 72.

It will be appreciated from a consideration of FIG. 3, for example, that when fasteners 50 are driven home to press license plate 14 against central panel 22 of holder 10, that, because of the overall configuration of the holder-plate assembly 10 that the holder assembly flexes slightly thereby firmly pressing marginal portions 68, 70 against the opposing surface 72 of bumper 12. It is preferred that during the installation of the plate-holder assembly 10 on the bumper 12 that the fasteners 50 be driven home only sufficiently to firmly press edges 68, 70 against surface 72 of bumper 12, and that they not be driven to such an extent that the rear of central panel 22 engages surface 72.

In the illustrated embodiment, a second pair of fastener openings 47, 47 are provided adjacent bottom single lock fold 32. However, in the event that an automobile plate mounting system has mounting means on the bumper 12 positioned so that the mounting means would align only with fasteners entering at the bottom of the license plate, e.g., approximately at the position of openings 47, 47, it is preferred that the holder 10 be inverted 180° with respect to the configuration shown in FIG. 1, so that the elongated single lock fold 32 is positioned at the top, and openings 46, 46 are aligned with the "bottom" position fastening means and that the top edge of the license plate be secured under elongated edge single lock flap 32, and that the bottom holes of the license plate be secured by fasteners through openings 46, 46 and entering the bottom oriented bumper fastening means.

It has been found that the presence of the rearwardly extending lateral margins 24, 26 is absolutely essential in accordance with the present invention, and that if these marginal portions are car the resulting holder will be very susceptible to damage and plate-holder removal by vertical axis rotary brushes in a car wash, for example.

However, in accordance with the present invention, it has been found that as a result of repeated passing of automobiles equipped with plate-holder assemblies 10 through car washes having vertical axis brushes engaging the license plate-holder assembly 10, that the plate holder assembly remains undamaged, and that the tendency for the plate-holder assembly 10 to be pulled to such an extent as to remove factory installed plastic insert plugs from the bumper has been alleviated.

Furthermore, it has been discovered that the slight flexing of the license plate for insertion into the holder of the present invention does not substantially reduce the readability of the plate, and in any event, provides a readability which is vastly superior to that of badly mangled, deformed and bent over license plates coming from car washes.

It has been discovered that the license plate holder of the present invention need not be made from heavy sheet metal and, in fact, it has been discovered that the license plate holder of the present invention works very well even though made from relatively thin sheet metal such as, for example, sheet aluminum.

However, it is essential, in accordance with the present invention, that the sheet metal from which the holder 20 is made be of sufficient stiffness for lateral marginal portions 24, 26 to maintain their substantially rearwardly extending configuration when license plate 14 is inserted within lateral single lock folds 28, 30.

As used herein, the term single lock fold or single lock bend is intended to refer to that type of fold or a marginal portion of the sheet of metal in which the folded-back portion remains spaced-apart from the main body of the sheet. Thus, it is to be distinguished from what is commonly called a hem fold in which the folded-back portion is firmly pressed against the main body. It is necessary in accordance with this invention that the spacing between the folded-back portion and the main body of the metal be sufficient for the reception of the license plate therein, and for the convenient sliding of the inserted license plate downwardly or upwardly under the elongated edge fold 32. It is preferred that the fold have an outside radius of at least about one-eighth inch, for example, inasmuch as the resulting rounded edge provides even less opportunity for engagement of a brush thereunder, and inasmuch as the rounded edge greatly enhances the rigidity of the edges 68, 70. Generally speaking, larger radii of single lock folds 28, 30, 32 are preferred, provided the dimensions of the folded back portions are great enough to maintain the corresponding edges of plate thereunder.

Moreover, while it is not intended that the invention be limited to any extent whatsoever by theories of operation, it is believed as a result of repeated observation that the presence of the raised offset portion 22 generates a pre-plate wave within the bristle mass of the brushes, and that as a result of the pre-plate wave, the ends of the bristle vertical axis rotary of the brushes (not shown) tend to be raised out of contact with the edges 68, 70 during operation.

The preferred embodiment described herein is provided for illustrative purposes only, and the invention is not to be construed as unduly limited thereby. It is to be understood that many variations and modifications can be made with the aid of the disclosure herein, without departing from the spirit or scope of the present invention.

In the illustrated embodiment assembly 10 is shown mounted on a bumper 14, but it is to be understood that it can be mounted on any exposed part of a vehicle.

We claim:

1. A license plate holder for mounting a rectangular license plate therein on a vehicle and for protecting the license plate against damage caused by vehicle-wash vertical axis rotary brushes, said license plate having a first pair of fastener openings positioned along a line parallel and adjacent a first elongated edge, said holder comprising: an integral sheet of stiffly resilient material having overall dimensions at least slightly greater than said license plate, said sheet material having vertical edges folded at the lateral extremes thereof to provide a single lock fold, at each of said lateral vertical edges; said holder having each lateral bent-back marginal portion thereof bent rearwardly along vertical bend regions located between the respective lateral edges of the holder and respective adjacent fastener openings; said vertical bend region defining a raised offset central panel in said holder, and wherein each of said bent-back portions form an obtuse angle with the rear face of said raised offset central portion; said holder also having an elongated single lock fold extending along that edge of said offset central panel opposite the first edge for securing an opposing portion of said plate thereunder, said elongated single lock fold extending between said bend lines, and being positioned to receive the corresponding edge of said license plate thereunder when said fastener openings of said plate and said holder are in register; said holder having a second pair of openings in the central portion thereof adjacent said elongated single lock fold for passage of fasteners therethrough, said openings being in register with said fastener openings on said license plate when said license plate is mounted in said holder; said lateral vertical single lock folds being spaced-apart from each other a sufficient distance to receive the lateral edges of said license plate therein, and for said holder to receive said plate parallel therewith.

2. The license plate holder of claim 1 wherein said fold lines are vertical and occur less than half way between said openings and said lateral edges.

3. The license plate holder of claim 1 wherein the front of said folded-back portion forms an angle between about 15° and 45° with a line extending from the face of the central portion, and wherein the central portion is offset with respect to the surface to which the license plate is attached by a distance between approximately ⅜ inches and 1 inch.

* * * * *

UNITED STATES PATENT OFFICE
CERTIFICATE OF CORRECTION

PATENT NO. : 3,867,776
DATED : February 25, 1975
INVENTOR(S) : Carl W. Drummond and
Donald L. Weber It is certified that error appears in the above-identified patent and that said Letters Patent are hereby corrected as shown below:

In column 4, line 10 take out "car" and insert --eliminated--.

Signed and sealed this 1st day of July 1975.

(SEAL)
Attest:

RUTH C. MASON
Attesting Officer

C. MARSHALL DANN
Commissioner of Patents
and Trademarks